United States Patent [19]

Bickel et al.

[11] E Re. 29,119

[45] Reissued Jan. 18, 1977

[54] 7-PYRIDINIUM METHYL CARBOXYL DERIVATIVES OF 7-AMINO-CEPHALOSPORANIC ACID

[75] Inventors: Hans Bickel, Binningen; Johannes Müller, Arlesheim, both of Switzerland; Rolf Bosshardt, deceased, late of Arlesheim, Switzerland, by Ruth Elisabeth Bosshardt-Schär, legal representative; Heinrich Peter, Binningen; Bruno Fechtig, Reinach, both of Switzerland

[73] Assignee: Ciba-Geigy Corporation, Ardsley, N.Y.

[22] Filed: Sept. 18, 1975

[21] Appl. No.: 614,397

Related U.S. Patent Documents

Reissue of:

[64] Patent No.: 3,757,013
Issued: Sept. 4, 1973
Appl. No.: 76,283
Filed: Sept. 28, 1970

[30] Foreign Application Priority Data

Oct. 10, 1969 Switzerland ..... 15269/69

[52] U.S. Cl. ..... 260/243 C; 260/239.1; 424/246

[51] Int. Cl.[2] ..... C07D 501/22; C07D 501/34; C07D 501/36

[58] Field of Search ..... 260/243 C

[56] References Cited

UNITED STATES PATENTS

| | | | |
|---|---|---|---|
| 3,553,203 | 1/1971 | Schwarz et al. | 260/243 C |
| 3,757,013 | 9/1973 | Bicket et al. | 260/243 C |
| 3,823,139 | 7/1974 | Elphinstone et al. | 260/243 C |
| 3,883,517 | 5/1975 | Heusler et al. | 260/243 C |

*Primary Examiner*—Nicholas S. Rizzo
*Assistant Examiner*—David E. Wheeler
*Attorney, Agent, or Firm*—Joseph G. Kolodny; John J. Maitner; Theodore O. Groeger

[57] ABSTRACT

7-Aminopyridiniumacetylamino-cephalosporanic acids and derivatives thereof. The new compounds have antibacterial properties.

8 Claims, No Drawings

7-PYRIDINIUM METHYL CARBOXYL DERIVATIVES OF 7-AMINO-CEPHALOSPORANIC ACID

Matter enclosed in heavy brackets [ ] appears in the original patent but forms no part of this reissue specification; matter printed in italics indicates the additions made by reissue.

The present invention is concerned with the manufacture of new therapeutically active derivatives of 7-amino-cephalosporanic acid (ACA) of the formula

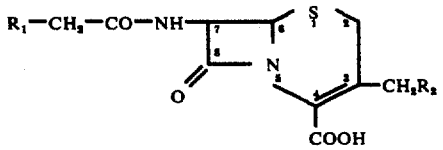

in which $R_1$ represents an aminopyridinium residue and $R_2$ is hydrogen, a free hydroxyl group or a hydroxyl group esterified by a carboxylic acid, in which ester oxygen atoms may be replaced by sulphur atoms, or is an unsubstituted or N-substituted carbamoyloxy or thiocarbamoylmercapto group and a process for their manufacture. The pyridinium residue contains the amino group in ortho- or preferably in para- or meta position and may contain further substituents, in the first place lower alkyls, for example, methyl or ethyl groups.

An esterified hydroxyl group $R_2$, in which oxygen atoms may be replaced by sulphur, is derived from a carboxylic acid and is, for example, a lower alkanoyloxy group which may be substituted for instance by halogen atoms, especially chlorine, such as a formyloxy, propionyloxy, butyryloxy, pivaloyloxy, chloracetoxy, especially acetoxy, or a monocyclic or dicyclic arylcarbonyloxy or -thiocarbonylox, arylcarbonylmercapto or -thiocarbonylmercapto group, especially the benzoylmercapto group, which cyclic groups may be substituted, for example, by lower alkyl, lower alkoxy or lower alkylmercapto residues, by halogen atoms or the nitro group.

$R_2$ may also be an unsubstituted or substituted carbamoyloxy group, for example a group of the formula $-O-CO-NH-R_3$ in which $R_3$ represents hydrogen, or an aliphatic, aromatic, araliphatic or heterocyclic residue, especially an unsubstituted or substituted (preferably by one or several lower alkoxy groups or halogen atoms) linear or branched lower alkyl group such as the methyl, ethyl or especially $\beta$-chloroethyl residue.

$R_2$ may also represent a thiocarbamoylmercapto group of the formula

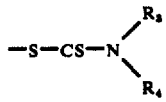

in which $R_3$ has the above meaning and $R_4$ represents hydrogen or is equal to $R_3$.

The new compounds display a particularly good antibacterial activity; they act both against Gram-positive and especially against Gram-negative bacteria, for example against Staphylococcus aureus (penicillin resistant), Escherichia coli, Klebsiella pneumoniae and Salmonella typhosa, as can be shown by animal tests, for example on mice, in which they display a chemotherapeutic activity on subcutaneous administration of a dose of 1 to 1000 mg/kg, depending on the kind of bacterial infection concerned. The new compounds can therefore be used for combating infections caused by such microorganisms, also as additives to animal fodders, for preserving victuals or as disinfectants. Particularly valuable are those compounds in which the aminopyridinium residue is the para-aminopyridinium residue and $R_2$ represents the acetoxy group or the methyl, ethyl or $\beta$-chloroethylcarbamoyl group.

The compounds of the present invention are accessible by known methods; thus they are obtained when a) a compound of the formula II

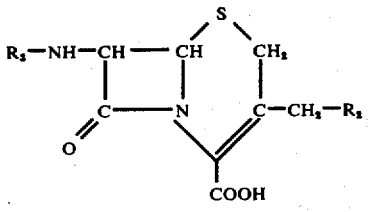

II, in which $R_3$ is the group $Z—CH_2—CO—$, wherein Z represents a reactive esterified hydroxyl group and $R_2$ has the meaning as indicated, is reacted with an amino pyridine; or b) a compound of the formula II, in which $R_3$ represents a hydrogen atom and $R_2$ has the meaning as indicated, is acylated by the group $R_1—CH_2—CO—$, wherein $R_1$ has the meaning as indicated; or c) the protective group (or groups) is eliminated from compounds of formula I, in which $R_1$ and $R_2$ have the meaning as indicated and the free amino group in $R_1$ and/or the 4-carboxyl group is protected;

and, if desired, a compound which has been obtained, in which $R_2$ represents the acetoxy group, is converted into a compound with free hydroxyl group $R_2$, or into a compound which contains an unsubstituted or N-substituted thiocarbamoylmercapto group, and a compound with free hydroxyl group $R_2$ into a compound which contains an ester group other than the acetoxy group (in which, if desired, oxygen atoms may be replaced by sulphur atoms), or into an unsubstituted or N-substituted carbamoyloxy group (in which oxygen atoms may be replaced by sulphur atoms).

The reaction of compound II according to process variant a) with an aminopyridine takes places at room temperature, or at slightly raised or lowered room temperature, such as 0° to 70° C, but preferably at 20–40° C. A reactive esterified hydroxy group is in the first place a hydroxy group esterified by a strong inorganic sulphonic acid, such as a lower alkyl or aryl sulphonic acid, for example, toluene sulphonic acid. Above all it is a hydroxy group esterified by a hydrohalic acid, namely hydrofluoric, hydrochloric, hydriodic, or especially hydrobromic acid. The reaction occurs preferably in the presence of an acid binding agent, for example a tertiary amine, especially a lower trialkylamine, preferably diisopropylamine (Hünig base).

The acylation of compound II, in which $R_3$ represents hydrogen, in accordance with process variant b) is carried out in conventional manner, especially according to the known methods for the acylation of weakly basic amino-acids, for example, by reacting compound II with an acid addition salt, especially the salt of a hydrohalic acid as mentioned above, for example, hydrochloric acid, of the acid halide, such as the acid fluoride, bromide, iodide, above all the acid chloride, of an acid of the formula $R_1$—$CH_2$—COOH. In addition, the acylation can be carried out by treating compound II with an N-carboxy anhydride (Leuch's anhydride) of an acid of formula $R_1$—$CH_2$—COOH.

In the case of process variant c), protective groups for the amino and/or carboxyl group are primarily groups which are known to be suitable for blocking these groups and which can be readily eliminated, for example by solvolysis, such as eliminating with water or alcohol, if desired, in an acid or weakly basic medium, or by reduction, for example, with hydrogen in the presence of a catalyst or with a metal such as zinc, for instance in glacial acetic acid or by means of nucleophile exchange, for example with thiophenolate, cf. British Patents 1,164,457 and 1,144,219, or by photolysis, preferably in a polar medium.

The amino group can be protected, for example, by acyl groups which are readily eliminable, especially acyl groups deriving from carbonic acid. Under acid conditions, for instance by treatment with a strong organic carboxylic acid, such as a halogen lower alkanecarboxylic acid, primarily trifluoroacetic acid, residues of this kind which are readily eliminable are, for example, unsubstituted or substituted carbo-lower alkoxy residues, primarily carbo-lower alkoxy groups which are polybranched in α-position or carbo-lower alkoxy groups which contain in α-position cyclic substituents of aromatic character, such as aromatic groups, for example phenyl, as well as biphenyl, for instance 4-biphenyl, or heterocyclic groups of aromatic character, for example 2-furyl, especially the carbo-tertiary butyloxy, as also the carbo-tertiary pentyloxy residue, the carbo-diphenylmethoxy, the carbo-2-(4-biphenyl)-2-propyloxy, the carbo-1,1-diphenylethoxy or the carbo-2-furfuryloxy residue, and carbo-cycloalkoxy residues in which cycloalkyl preferably represents a polycyclic cycloalkyl group, especially the carboadamantyloxy residue.

Acyl residues of semi-esters of carbonic acid that can be eliminated under reducing conditions, for example by treatment with hydrogen catalytically activated by metal, for instance nickel or palladium catalysts, or with nascent hydrogen which can be obtained, for example, by the reaction of metals, for instance zinc, or metal alloys or amalgams or salts, such as cobalt-II-acetate, upon suitable hydrogen donors, such as acids, especially lower alkanecarboxylic acids, or alcohols, such as lower alkanols, are, for example, carbo-lower alkoxy residues in which lower alkyl is substituted in α-position by aromatic groups, especially phenyl residues, or in the β-position by halogen, especially chlorine atoms, more especially the carbo-2,2,2-trichlorethoxy, carbo-2-iodethoxy or carbo-benzyloxy residue.

Carbo-lower alkoxy groups in which the lower alkyl residue, especially the methyl residue, contains in α-position one or two phenyl groups substituted by lower alkoxy, primarily methoxy and/or nitro, for example, m-methoxybenzyl, 3,5-dimethoxy-benzyl, 3,4-dimethoxy-6-nitrobenzyl, di-(para-methoxyphenyl)-methyl, α-phenyl-α-(3,4-dimethoxy-6-nitrophenyl)-methyl, α-methyl-α-(3,4-dimethoxy-6-nitrophenyl)-methyl, can also be eliminated in known manner by photolysis, for example by irradiation with ultraviolet light, preferably emitted by a high-pressure mercury vapour lamp.

Further amino protective groups are, for example, polyarylmethyl groups, in which aryl preferably stands for an unsubsituted or substituted phenyl group, especially the triphenylmethyl group. Such groups can be eliminated in known manner by treatment with suitable acid agents, such as a strong inorganic acid, for instance hydrochloric acid, or with an organic acid, for example, formic or acetic acid.

Furthermore, azido and nitro groups can be converted into the free amino group by reduction in known manner, for exampled by treatment with hydrogen activated catalytically, as with a palladium catalyst, or with nascent hydrogen.

A protected 4-carboxyl group is for example an esterified carboxyl group which is easily convertible into the carboxyl group, in the first place by reduction or under acid or neutral or mild alkaline conditions (up to pH 9).

Such esterified carboxyl groups as for example carbo-lower alkoxy groups in which the lower alkyl radical contains in β-position halogen, especially chlorine atoms, especially the carbo-2,2,2-trichlorethoxy and carbo-2-iodethoxy group, can be converted into the free carboxyl group by reduction, preferably by treatment with nascent hydrogen, under acid or neutral conditions, for example with zinc in the presence of a suitable lower alkanecarboxylic acid, such as acetic acid, especially dilute acetic acid, for instance of 90% strength, or with a strongly reducing metal salt, such as cobalt-II-acetate, in the presence of an aqueous medium.

A carbo-lower alkoxy group, in which lower alkyl in α-position is poly-branched and/or is substituted in α-position by one or more residues of aromatic character, such as unsubstituted or substituted aromatic hydrocarbon which has as substituents, for example, lower alkyl, lower alkoxy, nitro and/or halogen, especially unsubstituted or substituted phenyl, or heterocyclic groups of aromatic character, such as the 2-furyl group, especially the carbo-tertiary-butyloxy group, also the carbo-tertiary-pentyloxy group, the carbo-benzyloxy group, the carbo-para-methoxybenzyloxy group, the carbo-para-nitrobenzyloxy group, the carbo-2,4,6-trimethylbenzyloxy group, or the unsubstituted or substituted carbo-diphenylmethyloxy or carbocycloalkoxy group in which cycloalkyl represents a polycyclic residue such as the carbo-adamantyloxy group, furthermore, for example, the carbo-(3,4-dimethoxy-6-nitro)-benzyloxy group, the carbo-α-phenyl-α-(3,4-dimethoxy-6-nitrophenyl)-methoxy group, can be converted into the free carboxyl group by treatment with a suitable acid agent, such as a strong organic carboxylic acid, preferably a lower alkane carboxylic acid containing halogen, primarily trifluoroacetic acid, or by photolysis.

Esterified carboxyl groups, which are also easy to convert into the free carboxyl group under mild conditions are silylated and stannylated carboxyl groups. These are groups which are formed when compounds containing a free carboxyl group or their salts, such as alkali metal salts, for example the sodium salt, are treated with a suitable silylating agent such as a trilower alkyl-silyl halide, for example trimethylsilyl chloride or N-(tri-lower alkyl-silyl)-N-$R_a$-N-$R_b$-amine, in which $R_a$ represents a hydrogen atom or a lower alkyl group and $R_b$ a hydrogen atom, a lower alkyl group or a tri-lower alkyl-silyl group (cf. British Patent No. 1,073,530), or with a suitable stannylating agent, such as a bis-(tri-lower-alkyl-stannic)-oxide, for example, bis-(tri-n-butyl-stannic-oxide), a tri-lower alkyl-stannic hydroxide, for example triethyl-stannic hydroxide, a tri-lower alkyl-lower alkoxy-stannic, tetra-lower alkoxy-stannic or tetra-lower alkyl-stannic compound, such as a tri-lower alkyl-stannic halide, for example tri-n-butyl-stannic chloride (cf. Dutch Patent Specification 67/17107). The above-named starting materials containing silylated and stannylated carboxyl groups can be converted into the desired compounds with free carboxyl group by, for example, treatment with a preferably neutral hydrogen donor, especially water or an alcohol, such as a lower alkanol, for example, ethanol.

The cephalosporin derivatives used as starting materials are known or can be manufactured by known methods. Compounds of the Formula II, in which $R_2$ in an ester group other than the acetoxy group, are advantageously manufactured by the process disclosed in French Patent 1,588,507 (Case 6300/6217).

The conversion of the compound of the Formula I, in which $R_2$ represents the acetoxy group or a free hydroxy group in which $R_2$ represents another group or hydrogen, is carried out according to known methods. Thus a compound of Formula I, in which $R_2$ stands for the acetoxy group, may be converted by reduction into a compound which contains a hydrogen atom instead of the acetoxy group. The conversion of an acetoxy group $R_2$ into a hydroxyl group is carried out by treatment with deacetylizing agents, for example, by enzymatic desacetylizing with citrus-acetylesterase or with acetylesterase from microorganisms such as Bacillus subtilis. The acetoxy group can be converted into an N-substituted thiocarbamoylmercapto group by reaction with an alkali metal or ammonium salt of an N-substituted dithiocarbonic acid amide. A free hydroxyl group $R_2$ is converted into an N-substituted carbamoyloxy group by reaction with an isocyanic acid ester. The esterification of a free hydroxyl group $R_2$ with a carboxylic acid other than acetic acid is carried out, for example, according to the process as stated in the above-mentioned French Patent.

The invention includes also any variant of the process in which an intermediate obtained at any stage of the process is used as starting material and any remaining step(s) is/are carried out or the process is discontinued at any stage thereof, or in which the starting materials are formed under the reaction conditions, or in which the reactants may be in form of their salts.

The new compounds can be used as medicaments, for example in form of pharmaceutical preparations which contain the new compounds in admixture or conjunction with an organic or inorganic, solid or liquid pharmaceutical excipient suitable for enteral, local or parenteral administration. Suitable excipients are substances that do not react with the new compounds, for example water, gelatin, lactose, starches, stearyl alcohol, magnesium stearate, talcum, vegetable oils, benzyl alcohols, gums, propyleneglycol, polyalkyleneglycols, white petroleum jelly, cholesterol or other known medicinal excipients. The pharmaceutical preparations may be, for example, tablets, dragees, ointments, creams or capsules, or in liquid form solutions, suspensions or emulsions. They may be sterilized and/or may contain assistants such as preserving, stabilizing, wetting or emulsifying agents, solubilizers, salts for regulating the osmotic pressure or buffers. They may also contain further therapeutically valuable substances. The preparations are formulated by the conventional methods.

The following Examples illustrate the invention.

In thin-layer chromatography on silica gel plates the following systems are used:

System 52A = n-butanol + glacial acetic acid + water (67 : 10 : 23)

System 101 = n-butanol + pyridine + glacial acetic acid + water (38 : 24 : 8 : 30)

System 101D = n-butanol + pyridine + glacial acetic acid + water (34 : 24 : 12 : 30).

In the examples, "MIC" means the minimum inhibitory concentration (in $\gamma$/ml) which is measured by the gradient plate test described in "antibiotics" Vol. I by Gottlieb and Shaw, New York, 1967, page 508.

Example 1

3.9 Grams of 7-bromoacetylaminocephalosporanic acid and 1.7 ml of N,N-diisopropylethylamine are dissolved in 20 ml of methanol, then 0.94 g of 4-aminopyridine is added and the solution is kept for 12 hours at room temperature. By slow addition of ethyl acetate 7-[(para-aminopyridinium)-acetylamino]-cephalosporanic acid is precipitated as an amorphous powder. The substance is soluble in a warm 1:1-mixture of methanol and water and on cooling forms colourless flakes which decompose above 120° C without melting. The compound is readily soluble in dimethylsulphoxide, soluble in warm water, sparingly soluble in cold water, N-sodium hydrogencarbonate solution or methanol, and insoluble in acetone, ether and benzene.

In the ultraviolet spectrum (in water) $\lambda_{max} = 271$ m$\mu$ ($\epsilon = 30.900$). In the infrared spectrum (in Nujol) the compound reveals, inter alia, the following bands: 2,86, 3.00, 3.16, 5.65, 5.87, 5.96, 6.04, 6.22, 6.35, 6.46, 7.08, 7.48, 7.60, 7.75, 7.88, 8.10, 8.16, 8.30, 8.48, 8.62, 9.05, 9.38, 9.68, 10.08, 10.37, 12.00, 12.18, 12.36, 12.60 and 13.05$\mu$.

In thin-layer chromatography on silica gel the following Rf values are obtained after staining with iodine vapour:

$Rf_{52A}$ = 0.08 (for comparison: $Rf_{52A}$ of 7-bromoacetylaminocephalosporanic acid is 0.39);

$Rf_{101}$ = 0.37 (for comparison: $Rf_{101}$ of cephaloridine is 0.39);

$Rf_{101D}$ = 0.44 (for comparison: $Rf_{101D}$ of cephaloridine is 0.44).

MIC: Staphylococcus aureus SG 511 = 0.2. Staphylococcus aureus 2999 = 0.4; Bacillus subtilis = 0.035; Bacillus megatherium = 4.5; Bacillus cereus = 3.5; Escherichia coli 2018 = 35; Klebsiella pneumoniae = 25 $\gamma$/ml.

Example 2

14.1 Grams of 7-bromoacetylaminocephalosporanic acid are dissolved in 72 ml of methanol while adding 6.1 ml of N,N-diisopropylethylamine. 3.39 g of metaaminopyridine are then added and the solution is left to stand at room temperature. A brownish resin separates towards the end of the reaction, and after 17 hours, the yellow coloured solution is decanted. Then the resin is dissolved in a mixture of 10 ml of water and 10 ml of methanol and, while stirring, slowly mixed with 80 ml of methanol. After the mixture has stood briefly, the precipitate which has formed in the process (5.6 g) is filtered off. The filtrate is added to the above-described decantate, then the combined solutions are mixed with 300 ml of ethyl acetate. A fine, almost colourless precipitate (8.66 g) is formed which can be isolated by filtration and washing with ethyl acetate. This precipitate is further purified on a column of Sephadex G 10, in the following manner:

860 mg of the substance are dissolved in about 5 ml of water, poured on to the column ($\phi$ 2 cm, height 40 cm) and eluated with water. The first 20 ml of eluate consist largely of yellowish coloured, highly polar substances. The desired compound is eluated with the subsequent 40 ml of solution. This eluate is concentrated by evaporation in vacuo to a volume of about 3 - 5 ml and mixed with ten times its volume of ethanol and subsequently with thirty times its volume of ethyl acetate. After standing for one hour at 0° C, the precipitate is filtered off and the 7-[(meta-aminopyridinium-acetylamino]-cephalosporanic acid is obtained as a colourless powder.

In the ultra-violet spectrum (in water) $\lambda_{max} = 256$ nm ($\epsilon = 15500$) and $\lambda_{max} = 328$ nm ($\epsilon = 3450$). The optical rotation $[\alpha]_{20}^{D} = +150° \pm 1°$ (c = 0.79 in water).

In thin-layer chromatogram on silicagel (with iodine spray) the following Rf values are obtained:

$Rf_{52A} = 0.07$ (for bromoacetyl-7-ACA, $Rf_{52A} = 0.39$);
$Rf_{101} = 0.35$ (for cephaloridine, $Rf_{101} = 0.39$);
$Rf_{101D} = 0.43$ (for cephaloridine, $Rf_{101D} = 0.44$).

What is claimed is:

[ 1. A compound of Formula I

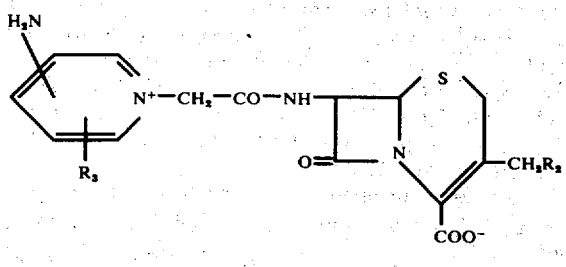

n which $R_2$ is hydrogen, hydroxyl, lower alkanoyloxy, ıalogeno-lower alkanoyloxy or monocyclic carbocyclic ırylcarbonyloxy or -thiocarbonyloxy, monocyclic car-ɔocyclic arylcarbonylmercapto or -thiocarbonylmer-:apto, unsubstituted or substituted by lower alkyl, ower alkoxy, lower alkylmercapto, halogen or nitro, or s an unsubstituted or N-lower alkyl, lower alkoxy-ower alkyl or halogeno-lower alkyl-substituted car-ıamoyloxy group or thiocarbamoylmercapto group, nd $R_3$ represents lower alkyl.]

[ 2. A compound of Formula I as claimed in claim 1, n which $R_1$ has the meaning as indicated therein and $R_2$ epresents the acetoxy group.]

[ 3. A compound of Formula I as claimed in claim 1, n which $R_1$ is the para-aminopyridinium group and $R_2$ epresents the acetoxy group.]

[ 4. A compound of Formula I as claimed in claim 1, n which $R_1$ is the meta-aminopyridinium group and $R_2$ epresents the acetoxy group.]

[ 5. A compound of Formula I as claimed in claim 1, n which $R_1$ has the meaning as indicated therein and $R_2$ epresents a lower alkylcarbamoyloxy group.]

[ 6. A compound of Formula I as claimed in claim 1, in which $R_1$ has the meaning as indicated therein and $R_2$ is a carbamoyloxy group of the formula $$-O-CO-NH-R_3$$

in which $R_3$ is lower alkyl substituted by one or several lower alkoxy groups or halogen atoms.]

[ 7. A compound of Formula I as claimed in claim 1, in which $R_1$ has the meaning as indicated therein and $R_2$ is a carbamoyloxy group of the formula $$-O-CO-NH-R_3$$

in which $R_3$ is lower alkyl substituted by one or several chlorine atoms.]

[ 8. A compound of Formula I as claimed in claim 1, in which $R_1$ has the meaning as indicated therein and $R_2$ is the $\beta$-chlorethylcarbamoyloxy group.]

*9. A compound of Formula I*

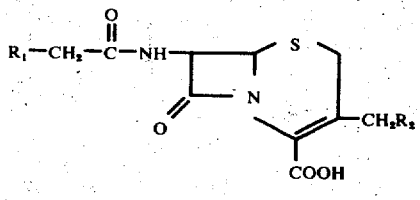

*in which $R_1$ represents an aminopyridinium radical substituted by lower alkyl and $R_2$ is hydrogen, hydroxyl, lower alkanoyloxy, halogeno-lower alkanoyloxy or monocyclic carbocyclic arylcarbonyloxy or -thiocarbonyloxy, monocyclic carbocyclic arylcarbonylmercapto or -thiocarbonylmercapto, unsubstituted or substituted by lower alkyl, lower alkoxy, lower alkylmercapto, halogen or nitro, or is an unsubstituted or N-lower alkyl, lower alkoxy-lower alkyl or halogeno-lower alkyl-substituted carbamoyloxy group or thiocarbamoylmercapto group.*

*10. A compound of Formula I as claimed in claim 9, in which $R_1$ has the meaning as indicated therein and $R_2$ represents the acetoxy group.*

*11. A compound of Formula I as claimed in claim 9, in which $R_1$ is the para-aminopyridinium group and $R_2$ represents the acetoxy group.*

*12. A compound of Formula I as claimed in claim 9, in which $R_1$ is the meta-aminopyridinium group and $R_2$ represents the acetoxy group.*

*13. A compound of Formula I as claimed in claim 9, in which $R_1$ has the meaning as indicated therein and $R_2$ represents a lower alkylcarbamoyloxy group.*

*14. A compound of Formula I as claimed in claim 9, in which $R_1$ has the meaning as indicated therein and $R_2$ is a carbamoyloxy group of the formula*

$$-O-CO-NH-R_3$$

*in which $R_3$ is lower alkyl substituted by one or several lower alkoxy groups or halogen atoms.*

*15. A compound of Formula I as claimed in claim 9, in which $R_1$ has the meaning as indicated therein and $R_2$ is a carbamoyloxy group of the formula*

$$-O-CO-NH-R_3$$

*in which $R_3$ is lower alkyl substituted by one or several chlorine atoms.*

*16. A compound of Formula I as claimed in claim 9, in which $R_1$ has the meaning as indicated therein and $R_2$ is the $\beta$-chlorethylcarbamoyloxy group.*

* * * * *